United States Patent Office 3,202,653
Patented Aug. 24, 1965

3,202,653
6-[α-HYDROXY- AND α-AMINO-α-PYRIDYLACET-AMIDO]PENICILLANIC ACIDS AND SALTS THEREOF
Lee C. Cheney, Fayetteville, and John C. Godfrey, Syracuse, N.Y., assignors to Bristol-Myers Company, New York, N.Y., a corporation of Delaware
No Drawing. Filed Apr. 1, 1963, Ser. No. 269,716
10 Claims. (Cl. 260—239.1)

This application is a continuation-in-part of our prior, copending applications Serial Nos. 190,776 and 190,777, both filed April 27, 1962, and both now abandoned.

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria and, more particularly relates to 6-[α-substituted-α-(pyridyl)acetamido]penicillanic acid, 6-[α-(3-pyridine)-acetamido]penicillanic acid and nontoxic salts thereof.

Antibacterial agents such as benzylpenicillin have proved highly effective in the past in the therapy of infections due to Gram-positive bacteria, but such agents suffer from the serious drawbacks of being unstable in aqueous acid, e.g., upon oral administration, and of being ineffective against numerous strains of bacteria, e.g., most Gram-negative bacteria. The compounds (I) of the present invention are particularly useful in that they possess potent antibacterial activity against both Gram-positive and Gram-negative bacteria upon either parenteral or oral administration and also exhibit resistance to destruction by acid and penicillinase.

There is provided, according to one aspect of the present invention, a member selected from the group consisting of an acid having the formula (I) 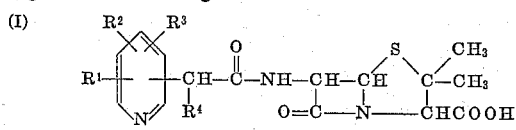

wherein $R^1$, $R^2$ and $R^3$ are each a member selected from the group consisting of hydrogen, chloro, bromo, fluoro, iodo, nitro, (lower)alkyl, (lower)alkoxy, (lower)alkylthio, (lower)alkylamino, di(lower)alkylamino, (lower)-alkanoylamino, (lower)alkanoyl and (lower)alkylsulfonyl, and wherein $R^4$ is a member selected from the group consisting of hydroxyl, amino, (lower)alkyl and phenyl; and the pharmaceutically acceptable nontoxic salts thereof, including nontoxic carboxylic acid metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidine (e.g., N-ethylpiperidine), other amines which have been used to form salts with benzylpenicillin. Also included within the scope of this aspect of the present invention are easily hydrolyzed esters or amides which are converted to the free acid form by chemical or enzymatic hydrolysis. The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g., "(lower)alkoxy," it refers to the alkyl portion of such group which is therefore as described above in connection with "(lower)alkyl."

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower)alkanoyl includes acetyl, propionyl, butyryl, etc.; (lower)alkylsulfonyl includes methylsulfonyl, ethylsulfonyl, hexylsulfonyl, etc.; di(lower)alkylamino includes dimethylamino, diethylamino, ethylmethylamino, etc.

The α-carbon atom of the acyl group (to which the $R^4$ group is attached) is an asymmetric carbon atom and the compounds of this aspect of this invention can therefore exist in two optically active isomeric forms (the D- and L-diastereoisomers), as well as in a mixture of the two optically active forms; all such isomeric forms of the compounds are included within the scope of the present invention.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

A preferred group of compounds of Formula I are those in which at least one of $R^1$, $R^2$ and $R^3$ is hydrogen; thus the pyridine moiety of such preferred compounds can be represented by the formula (IV) 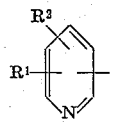

wherein $R^1$ and $R^2$ each have the meaning set forth above. Of these preferred compounds, a preferred subgroup is that wherein $R^1$ and $R^2$ are selected from the group consisting of hydrogen, (lower)alkoxy and chloro.

According to another aspect of this invention, there is provided a member selected from the group consisting of an acid having the formula (V) 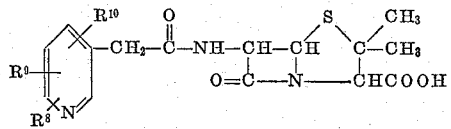

wherein $R^8$, $R^9$ and $R^{10}$ are each a member selected from the group consisting of hydrogen, chloro, bromo, fluoro, iodo, nitro, (lower)alkyl, (lower)alkoxy, (lower)alkylthio, (lower)alkylamino, di(lower)alkylamino, (lower)alkanoylamino, (lower)alkanoyl and (lower)alkylsulfonyl and the pharmaceutically acceptable nontoxic salts thereof, including nontoxic carboxylic acid metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, l-ephenamine, N,N'-dibenzylethylenediamine, dehydroabietylamine, N,N'-bis-dehydroabietylethylenediamine, N - (lower)alkylpiperidine (e.g., N-ethylpiperidine) and other amines which have been used to form salts with benzylpenicillin. Also included within the scope of this aspect of the present invention are easily hydrolyzed esters or amides which are converted to the free acid form by chemical or ensymatic hydrolysis. The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g. "(lower)alkoxy," it refers to the alkyl portion of such group which is therefore as described above in connection with "(lower)alkyl."

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower) alkanoyl includes acetyl, propionyl, butyryl, etc.; (lower) alkylsulfonyl includes methylsulfonyl, ethylsulfonyl, hexylsulfonyl, etc.; di(lower)alkylamino includes dimethylamino, diethylamino, ethyl methylamino, etc.

A preferred group of compounds of Formula V are those in which at least one of $R^8$, $R^9$ and $R^{10}$ is hydrogen; thus the pyridine moiety of such preferred compounds can be represented by the formula (VIII) 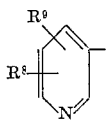

wherein $R^8$ and $R^9$ each have the meaning set forth above. Of these preferred compounds, a preferred subgroup is that wherein $R^8$ and $R^9$ are selected from the group consisting of hydrogen, (lower)alkyl, (lower) alkoxy and chloro.

The penicillins of Formula I may be prepared by the reactions of 6-aminopenicillanic acid, preferably in the form of a neutral salt such as the sodium, potassium or triethylamine salt, with an α-(pyridine)acetic acid having the formula (IX) 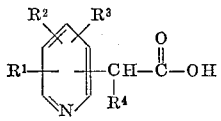

wherein $R^1$, $R^2$, $R^3$ and $R^4$ each has the meaning set forth above, or its functional equivalent as an acylating agent for a primary amino group. Such equivalents include the corresponding acid chlorides, bromides, acid anhydrides with other carboxylic acids, including monoesters and particularly lower aliphatic esters, of carbonic acid.

Thus, an excellent procedure for preparing the compounds of Formula I by way of reaction of an α-substituted-α-pyridine acetic acid and 6-aminopenicillanic acid in the presence of a carbodiimide reagent comprises adding a solution of 0.02 mole of a carbodiimide, such as N,N'-dicyclohexylcarbodiimide or N,N'-diisopropylcarbodiimide in 50 ml. of dioxane or other solvent such as tetrahydrofuran, methylene chloride, etc., to a solution of 0.02 mole of the sodium salt of 6-aminopenicillanic acid in 100 ml. of water and 165 ml. of dioxane. After about 1 minute, a solution of 0.022 mole of an acid corresponding to the acid of Formula IX in 50 ml. of dioxane is added and the mixture is stirred with cooling for 1-2 hours. Dicyclohexylurea which forms as a precipitate, is removed by filtration and washed with 25 ml. of cold water. The washing water is added to the filtrate and the filtrate is lyophilized. The residue from the lyophilization is treated with 75 ml. of cold water, the pH is adjusted to 6.5 with sodium bicarbonate, and any insoluble material is removed by filtration. The filtrate is cooled, layered with 100 ml. of ether and acidified to pH 2 with 6 N sulfuric acid. The layers are separated and the aqueous layer is extracted with another 100 ml. portion of ether. The aqueous layer is then adjusted to pH 4.0 with sodium bicarbonate and extracted with four 100 ml. portions of ethyl acetate. The combined ethyl acetate extracts are dried briefly over anhydrous sodium sulfate and the potassium salt of the penicillin is formed by the addition of 0.02 mole of potassium 2-ethylhexanoate.

The penicillins of Formula V may be prepared by the reaction of 6-aminopenicillanic acid, preferably in the form of a neutral salt such as the sodium, potassium or triethylamine salt, with an α-(3-pyridine)acetic acid having the formula (X) 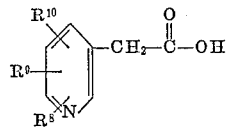

wherein $R^8$, $R^9$ and $R^{10}$ each have the meaning set forth above, or its functional equivalent as an acylating agent for a primary amino group. Such equivalents include the corresponding acid chlorides, bromides, acid anhydrides and mixed anhydrides with other carboxylic acids, including mono-esters and particularly lower aliphatic esters, of carbonic acid.

Thus, an excellent procedure for preparing the compounds of Formula V by way of reaction of an α-(3-pyridine)acetic acid and 6-aminopenicillanic acid in the presence of a carbodiimide reagent comprises adding a solution of 0.02 mole of a carbodiimide, such as N,N'-dicyclohexylcarbodiimide or N,N'-diisopropylcarbodiimide in 50 ml. of dioxane or other solvent such as tetrahydrofuran, methylene chloride, etc., to a solution of 0.02 mole of the sodium salt of 6-aminopenicillanic acid in 100 ml. of water and 165 ml. of dioxane. After about 1 minute, a solution of 0.022 mole of an acid corresponding to the acid of Formula X, in 50 ml. of dioxane is added and the mixture is stirred with cooling for 1-2 hours. Dicyclohexylurea which forms as a precipitate, is removed by filtration and washed with 25 ml. of cold water. The washing water is added to the filtrate and the filtrate is lyophilized. The residue from the lyophilization is treated with 75 ml. of cold water, the pH is adjusted to 6.5 with sodium bicarbonate, and any insoluble material is removed by filtration. The filtrate is cooled, layered with 100 ml. of ether and acidified to pH 2 with 6 N sulfuric acid. The layers are separated and the aqueous layer is extracted with another 100 ml. portion of ether. The aqueous layer is then adjusted to pH 4.0 with sodium bicarbonate and extracted with four 100 ml. portions of ethyl acetate. The combined ethyl acetate extracts are dried briefly over anhydrous sodium sulfate and the potassium salt of the penicillin is formed by the addition of 0.02 mole of potassium 2-ethylhexanoate.

The penicillins of the present invention can also be prepared by the use of an acid azide or a carbodiimide reagent as described by Sheehan and Hess, J. Amer. Chem. Soc., 77, page 1067 (1955). General methods for the preparation and purification of the α-keto penicillins of the present invention according to the mixed anhydride procedure and the acid chloride procedure are described and illustrated in U.S. Patent Nos. 2,941,995, 2,996,501 and 2,951,839.

The α-(3-pyridine)acetic acids, the α-(pyridine)-α-substituted acetic acids and the corresponding acetyl chlorides which may be used in the preparation of the compounds of the present invention may be prepared by a variety of synthetic methods which are common in the art. Most of these starting compounds are described in the prior art and many of them are commercially available. Detailed discussions of methods for the preparation of these starting materials are found in such reference works as the "Chemistry of Carbon Compounds," E. H. Rodd, editor (1956), Elsevier Publishing Company.

In the exemplified processes for the preparation of the compounds of Formulae I and V above, the compounds are sometimes in aqueous solution in the form of their sodium or potassium salt. These compounds in the aqueous phase can then be converted to the free acid, preferably in the cold under a layer of ether by the addition of dilute mineral acid, e.g., 5 N $H_2SO_4$ to pH 4. The free acid can then be extracted into a water-immiscible, neutral organic solvent such as ether, the extract washed with water quickly in the cold, if desired, and dried as with anhydrous $Na_2SO_4$ and the free acid recovered from the ethereal solution. The product in the ethereal extract in its free acid form can then be converted to any desired metal or amine salt, particularly the pharmaceutically acceptable nontoxic amine salts described above, by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

The following examples will serve to illustrate this invention without limiting it thereto.

EXAMPLE I

*Preparation of the potassium salt of 6-[α-hydroxy-α-(2-pyridine)acetamido]penicillanic acid*

Part A: A suspension of the cupric salt of α-hydroxy-α-(2-pyridyl)acetic acid (40.5 gm., 0.220 mole) in 200 ml. of water is cooled to 0° C. Hydrogen sulfide gas is bubbled through the suspension for one half hour. The suspension is then filtered and the filtrate is evacuated at 25° C. to remove the excess hydrogen sulfide. The resultant light brown solution, containing α-hydroxy-α-(2-pyridyl)acetic acid, has a volume of 160 ml. It is diluted to 660 ml. by the addition of dioxane.

Part B: 6-aminopenicillanic acid (43.2 gm.; 0.200 mole) and sodium bicarbonate (16.8 gm.; 0.200 mole) are dissolved in 1000 ml. of water. To this solution is added 1660 ml. of dry dioxane and the resulting solution is cooled to 14.9° C. To this solution after stirring there is added a solution of dicyclohexylcarbodiimide (41.2 gm.; 0.200 mole) in 500 ml. dioxane and, after one minute, the solution of α-hydroxy-α-(2-pyridyl)acetic acid prepared in Part A, above. Precipitation of dicyclohexylurea starts after about three minutes. The reaction mixture is stirred for 2 hours (temperature at beginning 15.7° C. dropped to 13.5° C. at conclusion of stirring), then is filtered to remove dicyclohexylurea (24.3 gm.). The filtrate is then lyophilized. The dry material resulting from lyophilization is extracted with two 600 ml. portions of ethyl acetate and filtered.

Part C: The ethyl acetate insoluble solids are extracted with three 500 ml. portions of dry acetone and the combined extracts are filtered. To the filtrate is added potassium 2-ethylhexanoate (20.0 gm.) in ether which results in the formation of a precipitate (12.8 g.). A portion of this precipitate (2.8 gm.) is recrystallized from solution in absolute ethyl alcohol, crystallization being induced by the addition of ethyl acetate. The product, the potassium salt of 6-[α-hydroxy-α-(2-pyridine)acetamido]penicillanic acid (2.2 gm.) is dried in vacuo overnight at 25° C. It is found to have a melting point of 190–195° C. with decomposition, to contain the β-lactam ring as shown by infrared analysis, to inhibit *Staph. aureus* Smith at a concentration of 0.8 mcg./ml. and to exhibit versus *Staph. aureus* Smith upon intramuscular injection in mice a $CD_{50}$ of 16 mg./kg.

EXAMPLE II

*Preparation of the N,N'-dicyclohexylureide of 6-[α-hydroxy-α-(2-pyridine)acetamido]penicillanic acid*

The two 600 ml. portions of ethyl acetate extracts obtained in Part B of Example I above are extracted with two 100 ml. portions of 1 N sulfuric acid. The combined acidic extracts are washed with 200 ml. of ether and neutralized to pH 7.5 by the addition of $NaHCO_3$. The solvent is removed by evaporation leaving 6.0 gm. of product. The product (6.0 gm.) is purified by dissolving in 35 ml. of ethyl acetate, filtering and precipitating by addition of 1 l. of "Skellysolve B" [mixed lower alkanes, principally n-hexane, boiling at about 60–68° C.]. The solution is filtered and solvent is removed from the filtrate by evaporation to reduce the volume. The solution is filtered again and 1.3 gm. of product is recovered. The filtrate is then diluted with 1 liter of "Skellysolve B" and the volume of the solution is reduced to about 600 ml. by evaporation at the boiling point of the solution. The solution is filtered and cooled with ice. Another 0.6 gm. of product is collected by filtration. The product, the N,N'-dicyclohexylureide of 6-α-hydroxy-α-(2-pyridyl)acetamido]penicillanic acid, is found to melt at 100–110° C., to contain the β-lactam structure as indicated by infrared analysis and to inhibit *Staph. aureus* Smith at a concentration of about 6.25 mg./ml.

EXAMPLE III

*Preparation of the sodium salt of 6-[α-hydroxy-α-(3-pyridine)acetamido]penicillanic acid*

6-aminopenicillanic acid (21.1 gm.; 0.0976 mole) and sodium bicarbonate (8.20 gm.; 0.0976 mole) are dissolved in 490 ml. of water and 812 ml. of dry dioxane and the resulting solution is cooled to 12° C. To this solution after stirring there is added a solution of dicyclohexylcarbodiimide (20.1 gm.; 0.0976 mole) in 245 ml. of dioxane and, after 45 seconds a solution of α-hydroxy-α-(3-pyridine)acetic acid hydrochloride (18.5 gm.; 0.0976 mole) (obtained by the acid hydrolysis of α-benzoyloxy-α-(3-pyridine)acetic acid hydrochloride), and sodium bicarbonate (8.20 gm.; 0.0976 mole) in 78 ml. of water and 245 ml. of dioxane. Precipitation of dicyclohexylurea starts almost immediately. The temperature of the reaction mixture drops from 12.9° C. to 10.1° C. over a reaction time of one hour. The mixture is then filtered to remove dicyclohexylurea (19.7 gm.), and the filtrate is lyophilized. The dry material resulting from lyophilization is dissolved in 400 ml. water, and then filtered to remove an insoluble material. The filtrate is adjusted to pH 2.0 with 6 N sulfuric acid and extracted with two 200 ml. portions of ethyl acetate, which were discarded. The aqueous solution is adjusted to pH 3.8 with sodium bicarbonate and lyophilized. The dry residue is triturated with 55 ml. of water and the insoluble material (11.2 gm.) is dissolved in 40 ml. of water and 360 ml. of acetone. The solution is filtered and treated with 4 gm. sodium 2-ethylhexanoate in ether. The solution is then flashed dry, using additional portions of ethyl acetate to remove traces of moisture. The product, the sodium salt of 6-[α-hydroxy - α - (3-pyridine)acetamido]penicillanic acid, is collected by filtration and is found to weigh 6.5 gm., to have a melting point of 213–216° C. with decomposition, to contain the β-lactam structure as shown by infrared analysis, to inhibit *Staph. aureus* Smith at a concentration of 3.1 mcg./ml. and to exhibit versus *Staph. aureus* Smith upon intra-muscular injection in mice a $CD_{50}$ of 22.5 mg./kg.

EXAMPLE IV

*Preparation of the potassium salt of 6-[α-(3-pyridine)propionamido]penicillanic acid*

Benzene (1090 ml.) is placed in a flask and swept with a stream of dry $N_2$ and distilled until about 270 ml. of benzene is collected. Ethyl 3-pyridineacetate (71.4 gm.; 0.433 mole), prepared by the reaction of 3-pyridineacetic acid and ethyl chloroformate, is added to the benzene along with a 50% dispersion of sodium metal (21.9 gm.; 0.433 mole) in cetane. The mixture is refluxed under a nitrogen atmosphere for 23 hours. It is then cooled to 10° C. by means of an ice bath and methyl iodide (67.7 gm.; 0.476 mole) is added in one portion. The ice bath is then removed and the mixture is allowed to warm while being stirred. After about 15 minutes, the temperature of the reaction mixture rises spontaneously to about 60° C. The mixture is stirred for 16 hours and 10 ml. of absolute ethyl alcohol and 25 ml. of 95% ethyl alcohol are added. The benzene is flashed off at 50° C. The residual material is dissolved in 500 ml. of water. The solution, having a pH of about 8.0, is extracted with five 800 ml. portions of ether, the extracts are combined, treated with charcoal, filtered, concentrated to about 2 liters by evaporation and extracted with two 450 ml. portions of 1.8 N sulfuric acid. Air is blown through the combined aqueous extracts to remove any ether and the combined extracts are filtered, and neutralized to pH 8.5 by the addition of sodium bicarbonate. The solution is then extracted with four 1-liter portions of ether and the combined ether extracts are dried over anhydrous sodium sulfate and filtered. The ether is removed from the filtrate by evaporation. The product, ethyl α-(3-pyridine)propionate, is distilled at 63.8–64.6° C. at a pressure of 0.10 mm. of mercury.

6-aminopenicillanic acid (4.32 gm.; 0.020 mole) and sodium bicarbonate (1.68 gm.; 0.020 mole) are dissolved in 100 ml. of water. Dioxane (50 ml.) is added and the solution is cooled to 13° C. While this solution is being stirred, a solution of dicyclohexylcarbodiimide (4.12 gm.; 0.020 mole) in 50 ml. of dioxane is added. After 30 seconds, there is added to this solution a solution which has been previously prepared by shaking together ethyl α-(3-pyridine)propionate (3.58 gm.; 0.0200 mole) and 20 cc. of 2 N sodium hydroxide (0.040 mole) for 15 minutes, adjusting the pH of the solution to 4.70 by the addition of 6 N sulfuric acid (about 7 cc. or 0.04 mole), and adding 50 ml. of dioxane. Within 5 minutes, precipitation of dicyclohexylurea is apparent. The reaction mixture is stirred for one hour, during which time the temperature falls from 13° C. to 10° C., and is filtered to remove dicyclohexylurea (2.62 gm.) and sodium sulfate. The dioxane and most of the water is removed from the filtrate by flashing off at 10–20° C. in a rotary evaporator. Then 80 ml. of water is added to the residual material and the pH is adjusted to 6.9 by the addition of sodium bicarbonate. Insoluble material is removed by filtration and the filtrate is extracted with two 100 ml. portions of ethyl acetate which are discarded. The pH of the aqueous layer is adjusted to 2.0 by the addition of 6 N sulfuric acid. The aqueous layer is extracted with two 100 ml. portions of ether which are discarded. The pH of the solution is then adjusted to 3.8 by the addition of sodium bicarbonate and the solution is concentrated to a volume of about 50 ml. by evaporation. The solution is then extracted with five 50 ml. portions of ethyl acetate, the extracts are combined, dried over anhydrous sodium sulfate and filtered. To the filtrate there is added potassium 2-ethylhexanoate (3 cc. of a 50% solution in n-butanol). The solution is then flashed dry using three additional 150 ml. portions of ethyl acetate to remove traces of moisture. There are then added 200 ml. of ethyl acetate and the mixture is filtered to recover 0.56 g. of the potassium salt of 6-[α-(3-pyridine)propionamido]penicillanic acid. The crystalline product is found to have a melting point of 160–170° C. with slight decomposition, to contain the β-lactam structure as shown by infrared analysis, to inhibit *Staph. aureus* Smith at a concentration of 0.2 mcg./ml. and to exhibit versus *Staph. aureus* Smith upon intramuscular injection in mice a $CD_{50}$ of 18 mg./kg.

EXAMPLE V

The process of Example IV is repeated and the product obtained (1.13 gm.) is dissolved in 15 ml. of water and the solution is filtered. The solution is then diluted with 75 ml. of acetone and 300 ml. of ethyl acetate and flashed at 30° C. It is flashed twice more with ethyl acetate to remove traces of moisture. The product, the potassium salt of 6-[α-(3-pyridine)propionamido]penicillanic acid, is precipitated, recovered by filtration and dried over anhydrous $P_2O_5$ in vacuo overnight. The product (0.89 gm.) is found to be mostly amorphous, to contain the β-lactam structure as shown by infrared analysis, to inhibit *Staph. aureus* Smith at a concentration of 0.2 mcg./ml. and to exhibit versus *Staph. aureus* Smith upon intramuscular injection in mice a $CD_{50}$ of 18 mg./kg.

EXAMPLE VI

*Preparation of 6-[α-(4-pyridine)glycylamido]penicillanic acid hydrochloride*

4-pyridinealdehyde (220 gm.; 2.06 mole), ammonium chloride (137 gm.; 2.56 mole) and potassium cyanide (165 gm.; 2.46 mole) are reacted to obtain α-amino-α-(4-pyridine)acetonitrile. This product (172 gm.; 1.29 mole) is then placed in concentrated HCl (1700 ml.) and allowed to stand for 5 days at room temperature after which time the HCl is boiled off until the liquid is about 7 N and the liquid is then flashed to remove the rest of the solvent. The product (132.2 gm.), α-(4-pyridine)glycine hydrochloride, is recovered as a solid.

6-aminopenicillanic acid (10.8 gm.; 0.050 mole) and triethylamine (5.06 gm.; 0.050 mole) are dissolved in 250 ml. of water and 415 ml. of dioxane. The mixture is cooled to 10.5° C. and a solution of dicyclohexylcarbodiimide (10.3 gm.; 0.050 m.) in 125 ml. of dioxane is added, followed in 45 seconds by the addition of a solution of α-(4-pyridine)glycine hydrochloride (9.43 gm.; 0.050 mole) and triethylamine (5.06 gm.; 0.050 mole) in 125 ml. of water and 125 ml. of dioxane. The mixture is stirred for 1½ hours at 10° C., and filtered to remove dicyclohexylurea and the filtrate is lyophilized. The dry material resulting from the lyophilization is dissolved in 200 ml. of water, the pH of the solution is adjusted to 8.2 by the addition of triethylamine and the solution is filtered. The pH of the filtrate is adjusted to 4.2 by the addition of 6 N hydrochloric acid and the solution is again lyophilized. The dry material resulting from lyophilization is extracted with 1 liter of a mixture of 95% acetone and 5% water, the extract is filtered and the filtrate flashed several times with ethyl acetate to remove all moisture. The solid material which remains (23.0 gm.) is extracted with 2-liter portions of methylene chloride to remove triethylamine hydrochloride leaving an insoluble yellow product, 6[α-(4-pyridyl)glycylamido)penicillanic acid hydrochloride. It is found to weigh 8.4 gm., to have a melting point of 160–170° C., to contain the β-lactam structure as shown by infrared analysis and to inhibit the growth of *Staph. aureus* Smith at a concentration of 3.1 mcg./ml., and to have the following elemental analysis for $C_{15}H_{18}N_4O_4 \cdot HCl \cdot H_2O$: C, 44.6; H, 5.2; N, 13.8. Found: C, 44.4; H, 5.7; N, 13.7.

EXAMPLE VII

*Preparation of 6-[α-(3-pyridine)glycylamido]penicillanic acid hydrochloride*

3-pyridinealdehyde (640 gm.; 5.98 mole) is added to a solution of ammonium chloride (400 gm.; 7.48 mole) and potassium cyanide (480 gm.; 7.17 mole) in a period of 45 minutes. At the end of this time, the solution is made basic by the addition of 448 gm. of potassium carbonate to obtain α-amino-α-(3-pyridine)acetonitrile. The product (512.5 gm.; 3.84 mole) is then placed in 5125 ml. of concentrated HCl and the solution is allowed to stand for 80 hours. The solvent is then flashed off and the 50% mixture of α-(3-pyridine)glycine hydrochloride and the byproduct, ammonium chloride (450.3 gm.) is recovered. This mixture is dissolved in 200 ml. of water and the solution is passed through an ion exchange column (Dowex 50WX8, polystyrene containing sulfonic acid groups). The eluate from the column is flashed to remove the water and the product, α-(3-pyridine)glycine (148.4 gm.), is dried over $P_2O_5$ in vacuo.

6-aminopenicillanic acid (4.32 gm.) and triethylamine (2.02 gm.) are dissolved in 100 ml. of water and 150 ml. of dioxane and the solution is cooled in an ice bath. There are then added to the solution N,N'-dicyclohexylcarbodiimide (4.13 gm.) in 50 ml. of dioxane and, after 1 minute, α-(3-pyridine)glycine (3.2 gm.) in a mixture of 25 ml. of water and 25 ml. of dioxane. The mixture is stirred for 1½ hours, then HCl (0.015 mole) is added and the mixture is stirred for another 45 minutes. Triethylamine (2.02 gm.) is then added and the mixture is filtered to remove dicyclohexylurea. The filtrate is lyophilized overnight and the resulting solid material is treated with 100 ml. of water. The pH of the mixture is adjusted to 8.5 and the mixture is filtered. To the filtrate there is added sufficient 6 N HCl to adjust the pH to 4.5 and the solution is again lyophilized. The solid material resulting from lyophilization is extracted with 425 ml. of a mixture of 95% acetone–5% water and the extract is filtered. The filtrate is flashed dry, using several portions of ethyl acetate to remove all moisture. The product, 6-[α-(3-pyridine)glycylamido]penicallanic acid hydrochloride is washed with methylene chloride and dried in vacuo. It is found to weigh 2.8 gm., to contain the β-lactam structure as shown by infrared analysis and to inhibit the growth of *Staph. aureus* Smith at a concentration of 0.001 percent by weight, and to have the following elemental analysis for $C_{15}H_{18}N_4O_4S \cdot HCl \cdot H_2O$ Calculated: C, 44.6; H, 5.2. Found: C, 44.5; H, 6.0.

EXAMPLE VIII

*Preparation of 6-[α-(3-pyridine)glycylamido]penicillanic acid*

α-(3-pyridine)glycine (30.42 gm.; 0.2 mole) is dissolved in 407 ml. of 1 N sodium hydroxide solution and 1690 ml. of water. The solution is cooled to 5° C. and 46.8 ml. of carbobenzoxy chloride is added. The solution is shaken vigorously for 25 minutes while maintaining the temperature at from 0 to 5° C. and is then filtered. The pH of the filtrate is adjusted to 3.9 by the addition of 6 N sulfuric acid. A white solid forms as a precipitate and is collected by filtration. The product, N-carbobenzoxy-α-(3-pyridine)glycine, is washed with ether. It is found to weigh 9.1 gm. and to have a melting point of 156–159° C. with decomposition.

6-aminopenicillanic acid (7.56 gm.; 0.035 mole) and sodium bicarbonate (2.94 gm.; 0.035 mole) are dissolved in 175 ml. of water. To this solution is added tetrahydrofuran (291 ml.) and the solution is cooled to 10° C. There are then added a solution of N,N'-dicyclohexylcarbodiimide (7.20 gm.; 0.035 mole) in 87.5 ml. of tetrahydrofuran and, after 45 seconds, a solution of N-carbobenzoxy-α-(3-pyridine)glycine (10 gm.; 0.035 mole) in 87.5 ml. tetrahydrofuran and 40 ml. of water. The mixture is stirred for 45 minutes at 10° C. and filtered to remove dicyclohexylurea. Tetrahydrofuran is flashed off of the filtrate and the aqueous fraction is filtered. The filtrate is extracted with three 175 ml. portions of ethylacetate, the pH of the solution is adjusted to 2.0 by the addition of 6 N sulfuric acid and the solution is extracted with another three 175 ml. portions of cold ethyl acetate. The pH of the aqueous layer is adjusted to 3.5 by the addition of sodium bicarbonate and the solution is extracted with another three 175 ml. portions of cold ethyl acetate. The extracts are combined, dried over anhydrous sodium sulfate and filtered. To the filtrate is added potassium 2-ethylhexanoate (12.6 gm.) as a 50% solution in ether. The ethyl acetate is flashed off and 1 liter of dry ether is added to the residual material. A white precipitate is collected by filtration and dried in vacuo over $P_2O_5$. The product, the potassium salt of 6 - [N - carbobenzoxy-α-(3-pyridyl)glycylamido]penicillanic acid, is found to weigh 4.4 gm., to have a melting point of 110–115° C., to contain the β-lactam structure as shown by infrared analysis and to inhibit *Staph. aureus* Smith at a concentration of 3.1 mg./ml.

The potassium salt of 6-[N-carbobenzoxy-α-(3-pyridine)glycylamido]penicillanic acid (3.2 g.; .00612 mole) is dissolved in 73.5 ml. of water and is hydrogenated under a hydrogen atmosphere of 45 p.s.i. for 45 minutes at 25° C., using 3.19 gm. of 30% palladium on diatomaceous earth as a hydrogenation catalyst. Following hydrogenation, the pH of the solution is adjusted to 2.2 and the catalyst removed by filtration. The pH of the filtrate is adjusted to 4.4 and the solution is lyophilized to remove water. The dry material resulting from lyophilization is dissolved in 5 ml. of water and is passed through an ion exchange column (IRC-50, 20–50 mesh, carboxylic acid type in $H^+$ form). The product is removed from the column with .01 N HCl and the eluate from the column flashed to remove the water. The product, 6-[α-(3-pyridine)glycylamido]penicillanic acid, is found to contain the β-lactam structure as shown by infrared analysis and to inhibit the growth of *Staph. aureus* Smith at a concentration of .001 percent by weight.

EXAMPLE IX

*Preparation of the potassium salt of 6-[α-phenyl-α-(3-pyridine)acetamido]penicillanic acid*

Using the general procedure of Example IV, 6-aminopenicillanic acid (0.020 mole) is reacted with α-phenyl-α-(3-pyridine)acetic acid (0.020 mole). The product, 6-[α-phenyl-α-(3-pyridine)acetamido]penicillanic acid is found to contain the β-lactam structure as shown by infrared analysis and to inhibit the growth of *Staph. aureus* Smith at a concentration of 0.001 percent by weight.

EXAMPLE X

In the general procedure of Example I, the α-hydroxy-α-(2-pyridine)acetic acid is replaced by 0.2 mole of α-Hydroxy-α-(5-chloro-3-pyridine)acetic acid,
α-Hydroxy-α-(4-bromo-3-pyridine)acetic acid,
α-Hydroxy-α-(3-chloro-4-pyridine)acetic acid,
α-Hydroxy-α-(5-methyl-3-pyridine) acedic acid,
α-Hydroxy-α-(5-phenyl-3-chloro-2-pyridine)acetic acid,
α-Hydroxy-α-(4-orthochlorophenyl-3-pyridine)acetic acid,
α-Hydroxy-α-(5-nitrophenyl-3-pyridine)acetic acid,
α-Hydroxy-α-(3,5-dimethyl-4-ethyl-2-pyridine)acetic acid,
α-Hydroxy-α-(5-cyclohexyl-3-pyridine)acetic acid,
α-Hydroxy-α-(5-diethylamino-4-pyridine)acetic acid,
α-Hydroxy-α-(4-methylsulfonyl-3-pyridine)acetic acid,
α-Hydroxy-α-(3-ethylthio-2-pyridine)acetic acid, and
α-Hydroxy-α-(4-cycloheptyloxy-3-pyridine)acetic acid, respectively, to produce the acids 6-[α-hydroxy-α-(5-chloro-3-pyridine)acetamido]penicillanic acid,
6-[α-hydroxy-α-(4-bromo-3-pyridine)acetamido]penicillanic acid,
6-[α-hydroxy-α-(3-chloro-4-pyridine)acetamido]penicillanic acid,
6-[α-hydroxy-α-(5-methyl-3-pyridine)acetamido]penicillanic acid,
6-[α-hydroxy-α-(5-phenyl-3-chloro-2-pyridine)acetamido]penicillanic acid,
6[α-hydroxy-α-(4-orthochlorophenyl-3-pyridine)acetamido]penicillanic acid,
6[α-hydroxy-α-(5-nitrophenyl-3-pyridine)acetamido]penicillanic acid,
6-[α-hydroxy-α-(3,5-dimethyl-4-ethyl-2-pyridine)acetamido]penicillanic acid,
6-[α-hydroxy-α-(5-cyclohexyl-3-pyridine)acetamido]penicillanic acid,
6-[α-hydroxy-α-(5-diethylamino-4-pyridine)acetamido]penicillanic acid,
6-[α-hydroxy-α-(4-methylsulfonyl-3-pyridine)acetamido]penicillanic acid,
6-[α-hydroxy-α-(3-ethylthio-2-pyridine)acetamido]penicillanic acid, and
6-[α-hydroxy-α-(4-cycloheptyloxy-3-pyridine)acetamido]penicillanic acid, respectively, which are isolated as their water-soluble potassium salt, found to contain the β-lactam ring as shown by infrared analysis and to inhibit *Straph. aureus* Smith at concentrations of 0.001% by weight.

EXAMPLE XI

In the general procedure of Example IV, the ethyl α-(3-pyridine)propionate is replaced by 0.0200 mole of Ethyl α-(5-chloro-3-pyridine)propionate,
Ethyl α-(4-bromo-3-pyridine)propionate,
Ethyl α-(3-chloro-4-pyridine)propionate,
Ethyl α-(5-methyl-3-pyridine)propionate,
Ethyl α-(5-phenyl-3-chloro-2-pyridine)propionate,
Ethyl α-(4-orthochlorophenyl-3-pyridine)propionate,
Ethyl α-(5-nitrophenyl-3-pyridine)propionate,
Ethyl α-(3,5-dimethyl-4-ethyl-2-pyridine)propionate,
Ethyl α-(5-cyclohexyl-3-pyridine)propionate,
Ethyl α-(5-diethylamino-4-pyridine)propionate,
Ethyl α-(5-propylamino-3-pyridine)propionate,
Ethyl α-(4-methylsulfonyl-3-pyridine)propionate,
Ethyl α-(5-hexoyl-3-pyridine)propionate,
Ethyl α-(3-ethylthio-2-pyridine)propionate,
Ethyl α-(4-cycloheptyloxy-3-pyridine)propionate, respectively, to produce the acids of 6-[α-(5-chloro-3-pyridine)propionamido]penicillanic acid,
6-[α-(4-bromo-3-pyridine)propionamido]penicillanic acid,
6-[α-(3-chloro-4-pyridine)propionamido]penicillanic acid,
6-[α-(5-methyl-3-pyridine)propionamido]penicillanic acid,
6-[α-(5-phenyl-3-chloro-2-pyridine)propionamido] penicillanic acid,
6-[α-(4-orthochlorophenyl-3-pyridine)propionamido] penicillanic acid,
6-[α-(5-nitrophenyl-3-pyridine)propionamido] penicillanic acid,
6-[α-(3,5-dimethyl-4-ethyl-2-pyridine)propionamido] penicillanic acid,
6-[α-(5-cyclohexyl-3-pyridine)propionamido] penicillanic acid,
6-[α-(5-diethylamino-4-pyridine)propionamido] penicillanic acid,
6-[α-(5-propylamino-3-pyridine)propionamido] penicillanic acid,
6-[α-(4-methylsulfondyl-3-pyridine)propionamido] penicillanic acid,
6-[α-(5-hexoyl-3-pyridine)propionamido] penicillanic acid,
6-[α-(3-ethylthio-2-pyridine)propionamido] penicillanic acid, and
6-[α-(4-cycloheptyloxy-3-pyridine)propionamido] penicillanic acid, respectively, which are isolated as their water-soluble potassium salts, found to contain the β-lactam ring as shown by infrared analysis and to inhibit *Staph. aureus* Smith at concentrations of 0.001% by weight.

EXAMPLE XII

In the general procedure of Example VII, the α-(3-pyridine)glycine is replaced by 0.02 mole of α-(5-chloro-3-pyridine)glycine,
α-(4-bromo-3-pyridine)glycine,
α-(3-chloro-4-pyridine)glycine,
α-(5-methyl-3-pyridine)glycine,
α-(5-phenyl-3-chloro-2-pyridine)glycine,
α-(4-orthochlorophenyl-3-pyridine)glycine,
α-(5-nitrophenyl-3-pyridine)glycine,
α-(3,5-dimethyl-4-ethyl-2-pyridine)glycine,
α-(5-cyclohexyl-3-pyridine)glycine,
α-(5-diethylamino-4-pyridine)glycine,
α-(4-methylsulfonyl-3-pyridine)glycine,
α-(3-ethylthio-2-pyridine)glycine, and
α-(4-cycloheptyloxy-3-pyridine)glycine, respectively, to produce the acids 6-[α-(5-chloro-3-pyridine)glycylamino]penicillanic acid,
6-[α-(4-bromo-3-pyridine)glycylamido]penicillanic acid,
6-[α-(3-chloro-4-pyridine)glyclamido]penicillanic acid,
6-[α-(5-methyl-3-pyridine)glycylamido]penicillanic acid,
6-[α-(5-phenyl-3-chloro-2-pyridine)glycylamido] penicillanic acid,
6-[α-(4-orthochlorophenyl-3-pyridine)glycylamido] penicillanic acid,
6-[α-(5-nitrophenyl-3-pyridine)glycylamido] penicilanic acid,
6-[α-(3,5-dimethyl-4-ethyl-2-pyridine)glycylamido] penicillanic acid,
6-[α-(5-cyclohexyl-3-pyridine)glycylamido] penicillanic acid,
6-[α-(5-diethylamino-4-pyridine)glycylamido] penicillanic acid,
6-[α-(4-methylsulfonyl-3-pyridine)glycylamido] penicillanic acid,
6-[α-(3-ethylthio-2-pyridine)glycylamido] penicillanic acid, and
6-[α-(4-cycloheptyloxy-3-pyridine)glycylamido] penicillanic acid, respectively, which are isolated as their water soluble potassium salts, found to contain the β-lactam ring as shown by infrared analysis and to inhibit *Staph. aureus* Smith at concentrations of 0.001% by weight.

EXAMPLE XIII

*Preparation of the potassium salt of 6-(3-pyridineacetamido)penicillanic acid*

A solution of 3-pyridinacetic acid (13.65 gms.; 0.0988 mole) in 150 ml. dry dimethylformamide and 350 ml. dichloromethane was prepared and cooled to −5° C. To this solution was added ethyl chloroformate (10.71 gm.; 0.0988 mole) causing the temperature to rise to −1° C. The reaction mixture was then cooled and stirred for ½ hour at −5° C.

A solution at −2° C. of 6-aminopenicillanic acid (22.4 gm.; 0.104 mole) in 250 ml. dichloromethane and dry triethylamine (29.3 cc.; 0.208 mole) was added all at once to the first reaction mixture causing the resulting reaction mixture to rise to 0° C. and carbon dioxide to be evolved for several minutes. The mixture was stirred for 40 minutes at −5° C. The dichloromethane was then flashed off at 35° C. and the resulting reaction mixture diluted with dry ether to 2 liters and filtered. Potassium 2-ethylhexanoate (20 gm.) in a small amount of ethylacetate was added to the filtrate causing a white crystalline precipitate to form. The precipitate was collected by filtration, dried, found to weigh 13.0 gm., and dissolved in 50 ml. of water acidified to pH 1.8 with 6 N sulfuric acid. The aqueous solution was extracted with two 100 ml. portions of ether. The aqueous solution was then adjusted to pH 4.0 with sodium bicarbonate, filtered and extracted with four 100 ml. portions of cold ethylacetate. The extract was then dried over anhydrous sodium sulfate and potassium 2-ethylhexanoate added to precipitate the product. The solution containing the precipitated product was then flashed dry and the product resuspended in ethyl acetate. The product, the potassium salt of 6-(3-pyridineacetamido) penicillanic acid, was collected by filtration, dried over $P_2O_5$, and found to weigh 0.45 gm., to melt at 224–227° C. with decomposition, to contain the β-lactam ring as shown by infrared analysis, to inhibit *Staph. aureus* Smith at a concentration of 0.1 mcg./ml., and to exhibit versus *Staph. aureus* Smith upon intramuscular injection in mice at $CD_{50}$ of 1.8 mg./kg.

EXAMPLE XIV

*Preparation of the potassium salt of 6-(3-pyridineacetamido)penicillanic acid*

6-aminopenicillanic acid (86.4 gm.; 0.400 mole) and sodium bicarbonate (33.6 gm.; 0.400 mole) was dissolved in 2000 ml. of water. To this solution was added 3320 ml. of dry dioxane and the resulting solution was stirred for one hour at 7° C. To this solution after stirring there was added a solution of dicyclohexylcarbodiimide (82.4 gm.; 0.400 mole) in 1000 ml. dioxane and, after one minute, a solution of 3-pyridineacetic acid (60.8 gm.; 0.400 mole) in 320 ml. water and 1000 ml. dioxane. Precipitation of dicyclohexylurea started almost immediately. The reaction mixture was stirred at 7° C. for 6 hours, then filtered to remove dicyclohexylurea (75.0 gm.) and the filtrate was lyophilized. The dry material resulting from lyophilization was dissolved in 750 ml. water, sodium bicarbonate added to adjust the pH to 7.0 and filtered to remove a gummy solid. The filtrate was extracted with two 750 ml. portions of ethyl acetate. The aqueous solution was adjusted to pH 4.0 with 6 N sulfuric acid (about 150 ml.) and extracted with five 800 ml. portions of ethyl acetate. The combined extracts were dried over anhydrous sodium sulfate and filtered. To the filtrate was added potassium 2-ethylhexanoate (18.0 gm.) in ether. The solution was then flashed dry, using two additional 300 ml. portions of dry ethyl acetate to remove traces of moisture. The dry residue containing the product was slurried with 300 ml. ethyl acetate. The product, the potassium salt of 6-(3-pyridineacetamido)penicillanic acid, was then collected by filtration, dried in vacuo over $P_2O_5$, and found to weigh 12.4 gm., to have a melting point of 214–218° C. with decomposition and to contain the β-lactam ring as shown by infrared analysis.

EXAMPLE XV

*Preparation of the potassium salt of 6-(3-pyridine-acetamido)penicillanic acid*

6-aminopenicillanic acid (86.4 gm.; 0.400 mole) and sodium bicarbonate (33.6 gm.; 0.400 mole) was dissolved in 2000 ml. of water. To this solution was added 3320 ml. of dry dioxane and the resulting solution was stirred for one hour at 7° C. To this solution after stirring there was added a solution of dicyclohexylcarbodiimide (82.4 gm.; 0.400 mole) in 1000 ml. dioxane and, after one minute, a solution of 3-pyridineacetic acid (60.8 gm.; 0.400 mole) in 320 ml. water and 1000 ml. dioxane. Precipitation of dicyclohexylurea started almost immediately. The reaction mixture was stirred for 2 hours (temperature at beginning 13.5° C. dropped to 9.7° C. at conclusion of stirring), then filtered to remove dicyclohexylurea (74.5 gm.), and the filtrate was lyophilized. The dry material resulting from lyophilization was dissolved in 750 ml. water, sodium bicarbonate added to adjust the pH to 7.0 and filtered to remove an insoluble white solid which was washed with 150 ml. water and dried in a lyophilizer to yield 29.4 gm. of dry residue. The aqueous solution was adjusted to pH 4.0 with 6 N sulfuric acid (about 150 ml.) and extracted with five 1000 ml. portions of ethyl acetate. The combined extracts were dried over anhydrous sodium sulfate and filtered. To the filtrate was added potassium 2-ethylhexanoate (18.0 gm.) in ether. The solution was then flashed dry, using two additional 500 ml. portions of dry ethyl acetate to remove traces of moisture. The dry residue containing the product was slurried with 500 ml. ethyl acetate. The product, the potassium salt of 6-(3-pyridineacetamido)penicillanic acid, was then collected by filtration, dried in vacuo over $P_2O_5$, and found to weigh 25.0 gm., to have a melting point of 200–206° C. with decomposition and to contain the β-lactam ring as shown by infrared analysis, to inhibit *Staph. aureus* Smith at a concentration of 0.1 mcg./ml. and to exhibit versus *Staph. aureus* Smith upon intramuscular injection in mice a $CD_{50}$ of 1.8 mg./kg.

The aqueous acidic extract (at pH 4) after extraction with five 1000 ml. portions of ethyl acetate as described above was lyophilized and the resulting dry residue extracted with two liters dry acetone in several portions, the combined extracts diluted with one liter dry ethyl acetate and the product, the potassium salt of 6-(3-pyridineacetamido)penicillanic acid, precipitated by the addition to the acetone extract of 60 gm. 50% potassium ethyl-2-hexanoate in n-butanol. The product was collected by filtration, dried in vacuo over $P_2O_5$ and found to weigh 54.2 gm., to melt with decomposition at 228–230° C., to contain the β-lactam ring as shown by infrared analysis and to have the following elemental analysis for

$C_{15}H_{16}N_3O_4SK \cdot H_2O$

Calculated: C, 46.02%; H, 4.63%. Found: C, 46.39%; H, 4.49%.

EXAMPLE XVI

*Preparation of the potassium salt of 6-[α-(6-methyl-3-pyridine)acetamido]penicillanic acid*

The sodium salt of α-(6-methyl-3-pyridine)acetic acid is prepared by adding α-(6-methyl-3-pyridine)acetic acid (8.4 gm.; 0.047 m.) to NaOH (2.07 gm.; 0.0517 m.) dissolved in 15 ml. of water. The reaction which occurs is exothermic. The reaction mixture is acidified with 6 N $H_2SO_4$ to a pH of 5.5.

A separate solution is prepared by dissolving 6-aminopenicillanic acid (10.2 gm.; 0.047 m.) in a mixture of 235 ml. of water, 389 ml. dioxane and 3.95 gm. of $NaHCO_3$. This solution is cooled to 5° C. and a solution of dicyclohexylcarbodiimide (9.69 gm.; 0.047 m.) in 118 ml. of dioxane is added. Subsequently, the previously prepared solution of α-(6-methyl-3-pyridine)acetic acid is added and the pH of the reaction mixture is adjusted from 7.5 to 6.8 by the addition of 6 N $H_2SO_4$. The pH is maintained at the level of 6.8 throughout the reaction. The reaction mixture is stirred for two hours at a temperature of from 2–10° C. The mixture is then filtered and the filtrate is lyophilized until dry, added to 100 ml. of water, and the pH is raised to 7.0 by the addition of $NaHCO_3$. There are then added 150 ml. of cold ether and the mixture is filtered. The water layer is separated and extracted again with 150 ml. of ether. The ether extract is discarded. The water layer is cooled to 0° C., acidified to pH 4.0 by the addition of 6 N $H_2SO_4$, filtered and the filtrate lyophilized until dry. The residue is then extracted with two 329 ml. portions of dry acetone by stirring each portion of the acetone with the dry residue for 45 minutes. To the combined acetone extracts there is then added 16.9 gm. of a 50% solution of potassium 2-ethylhexanoate in ether, which results in the formation of a precipitate. The precipitate is collected by filtration and washed thoroughly with dry ether. The product, the potassium salt of 6-[α-(6-methyl-3-pyridine)acetamido]penicillanic acid, is found to have a melting point of 187–189° C. with decomposition, to contain the β-lactam ring as shown by infrared analysis, and to inhibit *Staph. aureus* Smith at a concentration of 0.063 mcg./ml.

EXAMPLE XVII

*Preparation of the potassium salt of 6-[α(2-methyl-3-pyridine)acetamido]penicillanic acid*

Part A.: 1,3,3-triethoxy-1-propene (100 gm.; 0.574 m.) is mixed with acetyl acetone imide (56.8 gm.; 0.574 m.) and the mixture is refluxed for two hours. It is then cooled and the ethyl alcohol by-product is removed by flashing. The remaining dark oil is distilled under vacuum and the fraction boiling at from 126–148° C. (70.3 gm.) is collected and dissolved in 150 ml. of ether. This solution is extracted with about 350 ml. of 0.1 N HCl at which point the water layers are strongly acidic. The aqueous portion is then extracted with two 100 ml. portions of ether and treated with $NaHCO_3$ until basic. The solution is then extracted with two 500 ml. portions of ether and the ether layers are dried over $Na_2SO_4$, filtered and flashed with ethyl acetate. The product, 2-methyl-3-acetylpyridine (28.5 gm.; 0.211 mole) is mixed with morpholine (31.5 gm.; 0.362 mole) and elemental sulfur (11 gm.; 0.344 mole) and the mixture is refluxed for six hours. It is then cooled and allowed to stand for 17 hours during which time a solid is formed. Water (100 ml.) is then added and the mixture is heated to break up the solid material. The mixture is extracted with three 100 ml. portions of benzene, and the ether extracts are filtered, dried over $Na_2SO_4$ and refiltered. The solvent is then flashed off leaving crystalline α-(2-methyl-3-pyridine)thioacetomorpholide which has the formula

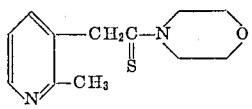

A portion of this product (30.3 gm.; 0.128 mole) is added to a mixture of 178 ml. of 95% ethyl alcohol and 30.4 ml. of 60% NaOH. The mixture is refluxed for 17 hours and is then acidified with concentrated HCl. Subsequently, an additional 100 ml. of concentrated HCl and 100 ml. of 100% ethyl alcohol are added and the mixture is refluxed for two hours. The mixture is then filtered and the filtrate is flashed to remove the ethyl alcohol. The remaining aqueous layer is neutralized with $NaHCO_3$ and extracted with about 300 ml. of ether. The aqueous layer is then concentrated by evaporation and the residue is dried over $P_2O_5$ in vacuo. It is then dissolved in 500 ml. of ethyl alcohol, saturated with dry HCl and refluxed for about 17 hours. The reaction mixture is then filtered and the filtrate is flashed down. The residue is dissolved in 100 ml. of water, the solution is neutralized with $NaHCO_3$ and extracted with about 300 ml. of ether. The ether layer is dried over $Na_2SO_4$, filtered and flashed down leaving a brown oil. This product is distilled under vacuum and the portion boiling at 81–82° C. is collected. The product is ethyl α-(2-methyl-3-pyridine)acetate (6.8 gm.).

Part B: The product obtained in Part A (6.8 gm.; 0.038 mole) is dissolved in 12.1 ml. of water containing 1.52 gm. of dissolved NaOH. The solution is heated and acidified to pH 5.5 by the addition of 6 N $H_2SO_4$. Dioxane (10 ml.) is then added to precipitate α-(2-methyl-3-pyridine) acetic acid. This product is then redissolved in water.

Part C: 6-aminopenicillanic acid (8.2 gm.; 0.038 m.) and $NaHCO_3$ (3.2 gm.; 0.038 m.) are dissolved in a mixture of 190 ml. of water and 315 ml. of dioxane. This solution is cooled to 10° C. and a solution of dicyclohexyl carbodiimide (7.83 gm.; 0.038 m.) in 95.4 ml. of dioxane is added. Subsequently, the solution of α-(2-methyl-3-pyridine)acetic acid prepared in Part B above is added and the pH of the reaction mixture is adjusted from 7 to 5.8 by the addition of 6 N $H_2SO_4$. The pH is maintained at this level throughout the reaction. The reaction mixture is stirred for two hours at a temperature of from 2–10° C. The mixture is then filtered and the filtrate is lyophilized until dry. The residue is added to 100 ml. of water and the pH is raised to 7.0 by the addition of $NaHCO_3$. There are then added 150 ml. of cold ether and the mixture is filtered. The water layer is separated and extracted again with 150 ml. of ether. The ether extract is discarded. The water layer is cooled to 0° C., acidified to pH 4.0 by the addition of 6 N $H_2SO_4$, filtered, and the filtrate lyophilized until dry. The residue is then extracted with two 300 ml. portions of dry acetone by stirring each portion of the acetone with the dry residue for 45 minutes. The combined acetone extracts are then dried over $Na_2SO_4$ and filtered. To the filtrate there is then added 13.8 gm. of a 50% solution of potassium 2-ethylhexanoate in ether which results in the formation of a precipitate. The precipitate is collected by filtration. The product, the potassium salt of 6-[α-(2-methyl-3-pyridine)acetamido]penicillanic acid, is found to have a melting point of 186–188° C. with decomposition, to contain the β-lactam ring as shown by infrared analysis, and to inhibit *Staph. aureus* Smith at a concentration of 0.5 mcg./ml.

EXAMPLE XVIII

In the general procedure of Example XV, the 3-pyridine-acetic acid is replaced by 0.40 mole of α-(2-chloro-3-pyridine)acetic acid,
α-(6-methyl-3-pyridine)acetic acid,
α-(5-bromo-3-pyridine)acetic acid,
α-(2-phenyl-5-chloro-3-pyridine)acetic acid,
α-(4-orthochlorophenyl-3-pyridine)acetic acid,
α-(5-nitrophenyl-3-pyridine)acetic acid,
α-(3,5-dimethyl-4-ethyl-3-pyridine)acetic acid,
α-(5-cyclohexyl-3-pyridine)acetic acid,
α-(2-diethylamino-3-pyridine)acetic acid,
α-(2-propylamino-3-pyridine)acetic acid,
α-(4-methylsulfonyl-3-pyridine)acetic acid,
α-(2-hexoyl-3-pyridine)acetic acid,
α-(4-ethylthio-3-pyridine)acetic acid, and
α-(2-cycloheptyloxy-3-pyridine)acetic acid, respectively, to produce the acids 6-[α-(2-chloro-3-pyridine)acetamido]penicillanic acid,
6-[α-(6-methyl-3-pyridine)acetamido]penicillanic acid,
6-[α-(5-bromo-3-pyridine)acetamido]penicillanic acid,
6-[α-(2-phenyl-5-chloro-3-pyridine)acetamido]penicillanic acid,
6-[α-(4-orthochlorophenyl-3-pyridine)acetamido]penicillanic acid,
6-[α-(5-nitrophenyl-3-pyridine)acetamido]penicillanic acid,
6-[α-(3,5-dimethyl-4-ethyl-3-pyridine)acetamido]penicillanic acid,
6-[α-(5-cyclohexyl-3-pyridine)acetamido]penicillanic acid,
6-[α-(2-diethylamino-3-pyridine)acetamido]penicillanic acid,
6-[α-(2-propylamino-3-pyridine)acetamido]penicillanic acid,
6-[α-(4-methylsulfonyl-3-pyridine)acetamido]penicillanic acid,
6-[α-(2-hexoyl-3-pyridine)acetamido]penicillanic acid,
6-[α-(4-ethylthio-3-pyridine)acetamido]penicillanic acid, and
6-[α-(2-cycloheptyloxy-3-pyridine)acetamido]penicillanic acid, respectively, which are isolated as their water-soluble, potassium salts, found to contain the β-lactam ring as shown by infrared analysis and to inhibit *Staph. aureus* Smith at concentrations of 0.001% by weight.

We claim:

1. A member selected from the group consisting of the acids having the formula

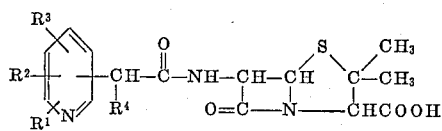

wherein $R^1$, $R^2$ and $R^3$ are each a member selected from the group consisting of hydrogen, chloro, bromo, fluoro, iodo, nitro, (lower)alkyl, (lower)alkoxy, (lower)alkylthio, (lower)alkylamino, di(lower)alkylamino, (lower) alkanoylamino, (lower) alkanoyl and (lower) alkylsulfonyl and wherein $R^4$ is a member selected from the group consisting of hydroxyl, amino, (lower)alkyl and phenyl- and their pharmaceutically acceptable nontoxic salts.

2. 6 - [α-hydroxy-α-(2-pyridine)acetamido]penicillanic acid.

3. 6 - [α-hydroxy-α-(3-pyridine)acetamido]penicillanic acid.

4. 6-[α-(3-pyridine)propionamido]penicillanic acid.

5. 6-[α-(4-pyridine)glycylamido]penicillanic acid.

6. 6-[α-(3-pyridine)glycylamido]penicillanic acid.

7. A member selected from the group consisting of the acids having the formula

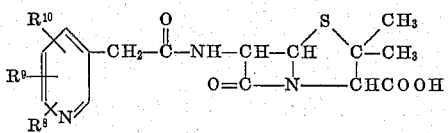

wherein $R^8$, $R^9$ and $R^{10}$ are each a member selected from the group consisting of hydrogen, chloro, bromo, fluoro, iodo, nitro, (lower)alkyl, (lower)alkoxy, (lower)alkylthio, (lower)alkylamino, di(lower)alkylamino, (lower)alkanoylamino, (lower)alkanoyl and (lower)alkylsulfonyl and their pharmaceutically acceptable nontoxic salts.

8. 6-(3-pyridineacetamido)penicillanic acid.
9. 6-[α-(6-methyl-3-pyridine)acetamido]penicillanic acid.
10. 6-[α-(2-methyl-3-pyridine)acetamido]penicillanic acid.

No references cited.

NICHOLAS S. RIZZO, *Primary Examiner.*